United States Patent
Sullivan (10) Patent No.: US 9,152,995 B2
(45) Date of Patent: Oct. 6, 2015

(54) METHOD AND SYSTEM FOR LOAN APPLICATION NON-ACCEPTANCE FOLLOW-UP

(75) Inventor: Richard Ali Sullivan, Mableton, GA (US)

(73) Assignee: CC Serve Corporation, Atlanta, GA (US)

( * ) Notice: Subject to any disclaimer, the term of this patent is extended or adjusted under 35 U.S.C. 154(b) by 1044 days.

(21) Appl. No.: 11/856,808

(22) Filed: Sep. 18, 2007

(65) Prior Publication Data

US 2009/0059909 A1    Mar. 5, 2009

Related U.S. Application Data

(60) Provisional application No. 60/969,117, filed on Aug. 30, 2007.

(51) Int. Cl.
| | | |
|---|---|---|
| G06F 15/16 | (2006.01) | |
| G06Q 40/02 | (2012.01) | |
| G06Q 10/06 | (2012.01) | |
| G06Q 10/10 | (2012.01) | |

(52) U.S. Cl.
CPC ............... *G06Q 40/02* (2013.01); *G06Q 10/06* (2013.01); *G06Q 10/10* (2013.01)

(58) Field of Classification Search
USPC .................. 709/204–205, 217–219; 370/360; 705/35, 38
See application file for complete search history.

(56) References Cited

U.S. PATENT DOCUMENTS

| | | |
|---|---|---|
| 5,535,322 A | 7/1996 | Hecht |
| 5,581,691 A | 12/1996 | Hsu et al. |
| 5,682,469 A | 10/1997 | Linnett et al. |
| 5,699,527 A | 12/1997 | Davidson |
| 5,785,595 A | 7/1998 | Gauselmann |
| 5,946,388 A | 8/1999 | Walker et al. |
| 5,956,024 A | 9/1999 | Strickland et al. |
| 6,064,731 A | 5/2000 | Flockhart et al. |
| 6,088,686 A | 7/2000 | Walker et al. |
| 6,144,955 A | 11/2000 | Tsuiki et al. |
| 6,170,011 B1 | 1/2001 | Macleod et al. |
| 6,233,566 B1 | 5/2001 | Levine et al. |
| 6,327,362 B1 | 12/2001 | Hull et al. |
| 6,385,584 B1 | 5/2002 | McAllister et al. |

(Continued)

OTHER PUBLICATIONS

McDermott, Judy "IntraLinks Fax-in to Increas Loan Transaction Efficiency", *Bank Loan Report*. New York: Sep. 20, 2004.

(Continued)

*Primary Examiner* — Mohamed Ibrahim
(74) *Attorney, Agent, or Firm* — Philip H. Burrus, IV (57) ABSTRACT

An interface system (100) configured for interaction between a client browser portal (105) and a server-based information handling system (102) includes an interaction controller (110) and a workflow processor (115). The interaction controller (110) and workflow processor (115) operate to transfer, deliver, operate upon, and manage data objects flowing to and from the system from the client browser portal (105). In one embodiment, a web step manager (112) and a flow step manager (113) work to execute workflows that ensure data is delivered to and from the information handling system (102) in an efficient manner. In another embodiment, process activities are executed to do the same. The system (100) facilitates automated on-line systems, such as an on-line installment loan system, to operate with off the shelf information handling systems (102).

16 Claims, 10 Drawing Sheets

(56) References Cited

U.S. PATENT DOCUMENTS

| | | |
|---|---|---|
| 6,424,968 B1 | 7/2002 | Broster et al. |
| 6,434,230 B1 | 8/2002 | Gabriel |
| 6,493,675 B1 * | 12/2002 | Kanaya et al. ............... 705/7 |
| 6,611,816 B2 | 8/2003 | Lebda et al. |
| 6,691,093 B2 * | 2/2004 | Shell .......................... 705/26 |
| 6,952,281 B1 | 10/2005 | Irons et al. |
| 6,983,287 B1 | 1/2006 | Jayanti et al. |
| 7,050,567 B1 | 5/2006 | Jensen |
| 7,178,109 B2 | 2/2007 | Hewson et al. |
| 7,321,298 B2 | 1/2008 | Judkins et al. |
| 7,556,192 B2 | 7/2009 | Wokaty, Jr. |
| 2001/0011228 A1 | 8/2001 | Shenkman |
| 2001/0029482 A1 | 10/2001 | Tealdi et al. |
| 2002/0029188 A1 | 3/2002 | Schmid |
| 2002/0055967 A1 | 5/2002 | Coussement |
| 2002/0059137 A1 | 5/2002 | Freeman et al. |
| 2002/0169816 A1 | 11/2002 | Meiri |
| 2003/0135451 A1 | 7/2003 | O'Brien et al. |
| 2003/0172135 A1 | 9/2003 | Bobick et al. |
| 2003/0206622 A1 | 11/2003 | Foster |
| 2003/0212904 A1 * | 11/2003 | Randle et al. ............... 713/200 |
| 2003/0225692 A1 | 12/2003 | Bosch et al. |
| 2003/0233316 A1 | 12/2003 | Hu et al. |
| 2004/0034592 A1 | 2/2004 | Hu et al. |
| 2004/0044772 A1 * | 3/2004 | Harkin ......................... 709/227 |
| 2004/0215552 A1 | 10/2004 | Horn et al. |
| 2004/0267665 A1 | 12/2004 | Nam et al. |
| 2005/0026129 A1 * | 2/2005 | Rogers ......................... 434/322 |
| 2005/0055231 A1 | 3/2005 | Lee et al. |
| 2005/0075964 A1 | 4/2005 | Quinn et al. |
| 2005/0080721 A1 | 4/2005 | Kearney et al. |
| 2005/0102225 A1 * | 5/2005 | Oppenheimer et al. ........ 705/38 |
| 2005/0125348 A1 | 6/2005 | Fulton et al. |
| 2005/0148338 A1 | 7/2005 | Baumeister et al. |
| 2006/0031159 A1 | 2/2006 | Minot et al. |
| 2006/0069599 A1 | 3/2006 | Hatoun et al. |
| 2006/0069640 A1 | 3/2006 | Fitzgerald et al. |
| 2006/0265258 A1 | 11/2006 | Powell et al. |
| 2006/0288222 A1 | 12/2006 | Dunkley |
| 2007/0013948 A1 | 1/2007 | Bevan |
| 2007/0028207 A1 | 2/2007 | Nakata et al. |
| 2007/0050285 A1 | 3/2007 | Freeman |
| 2007/0179827 A1 | 8/2007 | Gupta et al. |
| 2007/0239574 A1 | 10/2007 | Marlow |
| 2008/0126244 A1 | 5/2008 | Loving et al. |
| 2008/0225872 A1 | 9/2008 | Collins et al. |

OTHER PUBLICATIONS

Business Wire, "First Franklin Chooses Blaze Advisor to Drive Automated Underwriting; Blazed Underwriting Process Responds to Individual Customer Needs", *On-Line Publication*.
WIPO, "International Preliminary Report on Patentability", PCT/US2008/071625, Filed Jul. 30, 2008.
WIPO, "International Preliminary Report on Patentability", PCT/US2008/071617, Filed Jul. 30, 2008.
WIPO, "International Preliminary Report on Patentability", PCT/US2008/071612, Filed Jul. 30, 2010.
Liversedge, Jennifer "Non-Final Office Action", U.S. Appl. No. 11/856,785, filed Sep. 18, 2007, Mailed Mar. 16, 2010.
Liversedge, Jennifer "Final Office Action", U.S. Appl. No. 11/856,785, filed Sep. 18, 2007, Mailed Aug. 19, 2010.
Kwong, Cho Y., "Non-Final Office Action", U.S. Appl. No. 11/856,817, filed Sep. 18, 2007, Mailed Jul. 5, 2011.
Kwong, Cho Y., "Final Office Action", U.S. Appl. No. 11/856,817, filed Sep. 18, 2007; Mailed Nov. 21, 2011.
Kwong, Cho Y., "NonFinal Office Action", U.S. Appl. No. 11/856,817, filed Sep. 18, 2007; Mailed May 24, 2012.
Kwong, Cho Y., "Final OA", U.S. Appl. No. 11/856,817, filed Sep. 18, 2007; Mailed Nov. 14, 2012.

\* cited by examiner

METHOD AND SYSTEM FOR LOAN APPLICATION NON-ACCEPTANCE FOLLOW-UP

CROSS REFERENCE TO PRIOR APPLICATIONS

This application claims priority and benefit under 35 U.S.C. §119(e) from U.S. Provisional Application No. 60/969,117, filed Aug. 30, 2007.

BACKGROUND

1. Technical Field

This invention relates generally to a system and method for interfacing with a data management system, and more particularly to a system and method configured to interface, transfer, format, and manage data between a user interface, such as a web page, and a data management system, such as a call center interface used by customer service representatives to manage customer data.

2. Background Art

Advances in technology have revolutionized the way companies do business. Not too long ago, when a customer called a company with an issue, the customer service representative had to retrieve a paper file prior to talking with the customer. With the advent of computers, customer service representatives became able to access files electronically. This electronic access made responding to customer issues more efficient.

As technology continued to advance, companies began to track more and more information. For example, rather than providing a customer service representative with basic customer information, such as name, address, and account number, companies found that customer service representatives could be more helpful with greater information. Many companies want to provide all of this information to customer service representatives when they address customer issues.

Managing all of this customer information in an efficient manner is cumbersome. Where there are many customer data fields, records, and files, intelligent organization and formatting of this information becomes essential. To address this need, application service providers began to develop data viewer applications. These applications facilitate the presentation of multiple-file data to a customer representative in a clean and efficient manner.

While such tools work well for this application, it is often difficult to customize these application specific tools to automated process. For example, many of these tools have specifically defined interfaces. Data must be entered and retrieved in a very specific manner, using tool-specific commands and rules. When data organization tools are paired with other automation tools, and the interfaces do not match, numerous problems occur, including corrupt or lost data, error messages, and incomplete data operations. One place where such problems occur is where business processes are developed outside the data management tool, including web-page interfaces.

There is thus a need for an interface tool for information handling systems that facilitates data entry and retrieval from the information handling system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to interfacing a server-based information handling system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of interfacing with an information handling system as described herein. The non-processor circuits may include, but are not limited to, a web server, a network such as the Internet, switches and communication relays, well known computer platforms such as Java and Javascript, and user input devices. As such, these functions may be interpreted as steps of a method to perform the steps of interfacing with information handling systems. Alternatively, some or all functions could be implemented by a state machine that has no stored program instructions. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Figure 1:
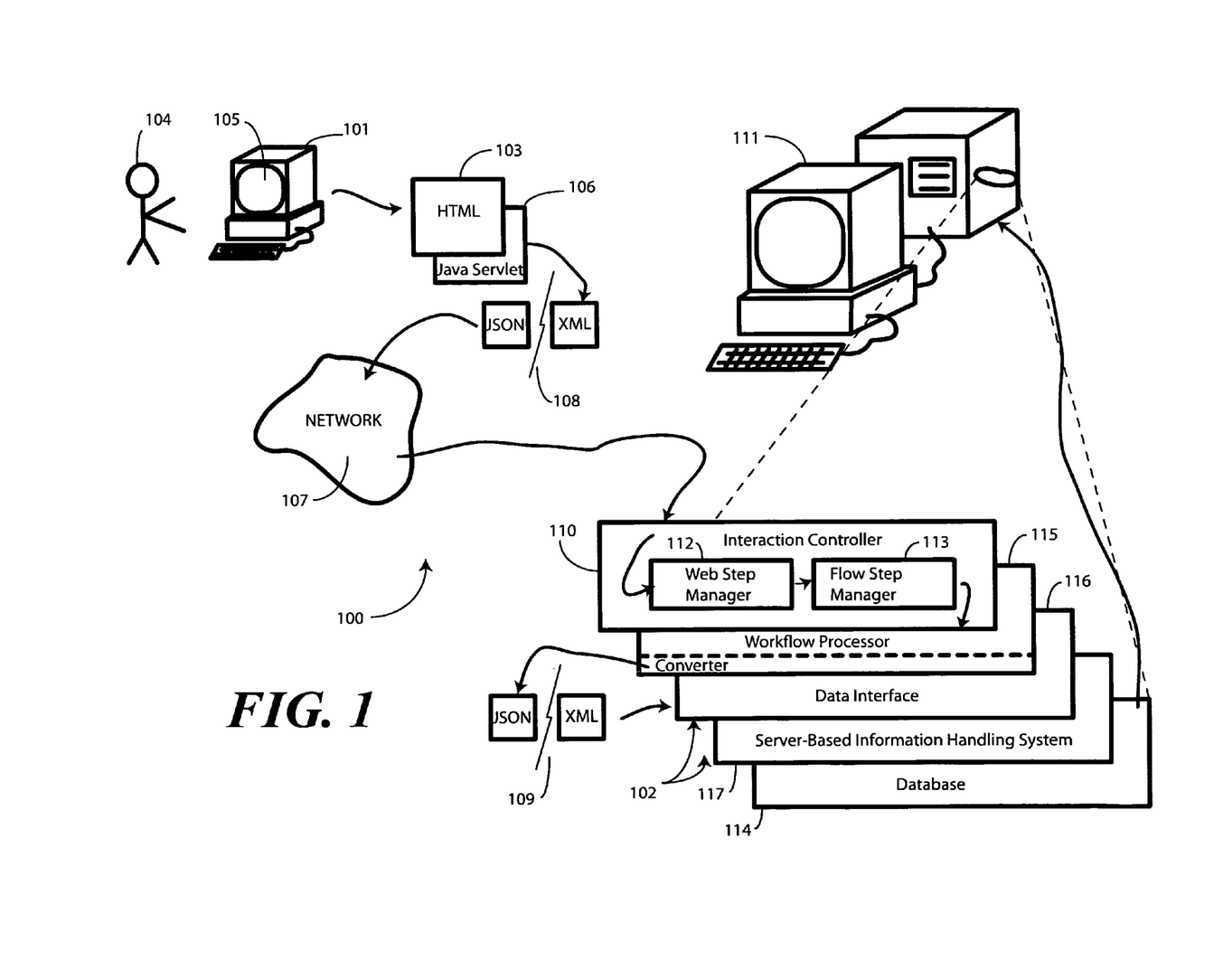
FIG. 1 illustrates an interface system configured for interaction between a networked client portal and a server-based information handling system in accordance with embodiments of the invention.

Turning now to FIG. 1, illustrated therein is one embodiment of an interface system 100 for interaction between a networked client portal 101 and a server-based information handling system 102 in accordance with the invention. Such a system 100 is useful, for example, to interface between a web page 103 and the information handling system 102 in automated applications where a user provides information to a company for processing. By way of example, in an on-line loan application, where the user 104 accesses the web page 103 to provide personal and financial information with the hope of obtaining a loan, the system 100 is suitable for managing the flow, processing, and manipulation of that data (which may move as a data object) to and from the information handling system 102. Thus, the system 100 may be used to reliably and efficiently automate operations such as loan offer, acceptance, and processing between known applications like web pages 103 and off-the shelf information handling systems 102.

The web page 103, in one embodiment, is provided to the user 104 through a client browser portal 105. The client browser portal 105 may be that of a web browser operating on a portable computer and displaying web page content. In one embodiment, the web page 103 is a standard hypertext mark-up language (HTML) document configured to present information to the user. Continuing with the on-line loan example, a first web page 103 may be a user information page that collects information about the user including name, address, social security number, bank account numbers and the like.

The client browser portal 105 may also include background operations for managing data. In one embodiment, the client browser portal 105 includes a servlet 106, such as a Javascript servlet, for locating, retaining, and manipulating data objects. A company, for example, may program the servlet 106 to run in the background on the client browser portal 105 to make the capture and movement of data more efficient.

Data entered by the user 104 is generally in text form. To transmit it across the network 107, it may be packaged into an object in any number of language/convention formats. For instance, the data object may be an Extensible Mark-up Language (XML) object. It may be an HTML object. In accordance with one embodiment of the invention, the servlet 106 is programmed to transmit the data object across the network 107 in a predetermined format. In one embodiment, for example where the servlet 106 is a Javascript servlet, this data object is transmitted as a Javascript Object Notation (JSON) object. Note that where another format is used, such as XML in acquiring the data, embodiments of the invention perform a conversion 108 into the predetermined format. In this exemplary embodiment, the servlet 106 is programmed to transform the data object from XML to JSON at conversion 108. The data object then transfers across the network 107.

An interaction controller 110 receives the data. In one embodiment, the interaction controller 110 is a software module operating on a computer platform 111, such as a server. The interaction controller 110 may be one of a plurality of modules comprising the system 100. The interaction controller 110 is configured to receive data objects from the client browser portal 105. The interaction controller 110 is then configured identify a workflow corresponding to the data object. For example, where the data object is a new prospective borrower wishing to begin an on-line installment loan application, the workflow may correspond to initiating an account. Similarly, where the data object is from a client with an established account, the workflow may correspond to presenting the client's current account status in the client browser portal 105. As a business may provide many different use cases for data received, the system 100 and the interaction controller 110 may have many workflows stored in memory from which to choose.

The interaction controller 110, in one embodiment, comprises several modules. One such module is the web step manager 112. The web step manager 112 is configured to load a workflow interaction component. The workflow interaction component includes workflow elements configured to interface with the information handling system 102. In one embodiment, the workflow interaction component comprises a form into which data is written. In the exemplary case of a prospective borrower applying for the loan, the workflow component may be a form for personal information such as name, social security number, address, occupation, and so forth. The workflow interaction component may have a predetermined workflow associated therewith. Each flow step of the predetermined workflow may include process steps to be executed during the workflow process.

A flow step manager 113 is also included with the interaction controller 110. The flow step manager 113, in one embodiment, is configured to execute each of the flow steps. The flow step manager 113 executes these flow steps by delivering data from the data object to the information handling system 102. The flow step manager 113 may also give temporary control of the data to the information handling system 102, such that the information handling system 102 may execute its own workflows associated with storing the information in the database 114 and presenting the information to a customer service representative or account manager when needed. Once the information handling system 102 has processed its workflow, it will then hand a result and control back to the flow step manager 113. The flow step manager 113 then determines the nest flow step to execute in the workflow. The next step to execute could be another flow step, which would require another interaction with the information handling system 102. The next step may also be a web step. Web steps are used to provide information to, as well as receive information from, the user 104. For instance, a web step may include display information, such as "additional information requested." This display information is delivered to the client browser portal 105 for presentation to the user 104.

Large amounts of data may be transferred across the network 107 as objects. In certain workflows, the information handling system 102 may require only subsets of that information. In these cases, subsets of data will need to be extracted from the data sets. Failure to do so may overload the information handling system. This extraction may be done by any of the interaction controller 110 upon receipt, the web step manager 112 upon selecting the workflow, or the flow step manager 113 upon executing the flow step.

The flow step manager 113 executes the flow steps in conjunction with a workflow processor 115. One function of the workflow processor 115 is to adapt the extracted data into a predetermined format recognized by the data interface 116 of the information handling system 102. As noted above, many off the shelf information handling systems 102 use XML data objects. However, these data objects are cumbersome to move across a network. As such, embodiments of the present invention employ JSON data objects for network transfer. To accommodate the information handling system 102, the workflow processor 115, in one embodiment, is configured to adapt the extracted data into a format recognized by the data interface 116 of the information handling system 102. For example, a conversion 109 from JSON to XML may occur such that the data interface 116 is able to parse and read the data.

As noted above, in some embodiments, the flow step manager 113 is required to deliver process control to the information handling system 102. In these situations, the flow step manager 113 is configured or programmed to deliver this process control to the data interface 116 of the information handling system 102. This delivery of process control is concurrent with, or just after, delivery of the extracted data to the data interface 116. The flow step manager then pauses in a wait state to allow the engine 117 of the information handling system 102 operate on the data. This operation may include presentation to displays, storage to databases, and other operations.

When extracted data and/or control is delivered to the information handling system 102, the information is then processed in accordance with its rules. One example of such a system is the customer service information handling system as shown and described in U.S. Pat. No. 7,187,109 to Tikka et al., issued Mar. 6, 2007, entitled "Electrical component having overlapping electrodes, and method for the manufacture of same." That system provides a customer service interface for viewing reference data, such as customer data, associated with a conceptual entity. The system also facilitates processes for manipulating data stored in a database 114, such as customer information, loan information, financial information, payment information, credit information, and the like. The system provides this interface by presenting a customer service representative with a process panel having one or more on-screen objects. Each object may permit editing or additions of data. The system includes a data viewer having a content pane for the display of the reference data and one or more on-screen objects. The system can selectively display reference data, the process panel, and the data viewer within a common window. In one embodiment, the process panel and data viewer are selectably viewable and occupy overlapping positions within the common window.

When used with embodiments of the system 100 of the present invention, the combination of data interface and information handling system 102 provide a robust and automated business engine for customer acquisition. Using an on-line installment loan business as an example, customers may apply for loans via the client browser portal 105. This data then gets routed efficiently to the information handling system 102 through the interaction controller 110, web step manager 112, and flow step manager 113. The data is then delivered to the information handling system 102 without the need of modifications to the information handling system 102. As such, an off the shelf information handling system 102 may be used. As the interaction controller 110 employs workflows to execute steps by way of the web step manager 112 and the flow step manager 113, the business is able to quickly alter rules and processes in real time. For instance, should the business want to change from an on-line installment loan system to an on-line credit card system, they need only alter the workflow and/or the flow steps. The system 100 can remain unchanged.

Figure 2:
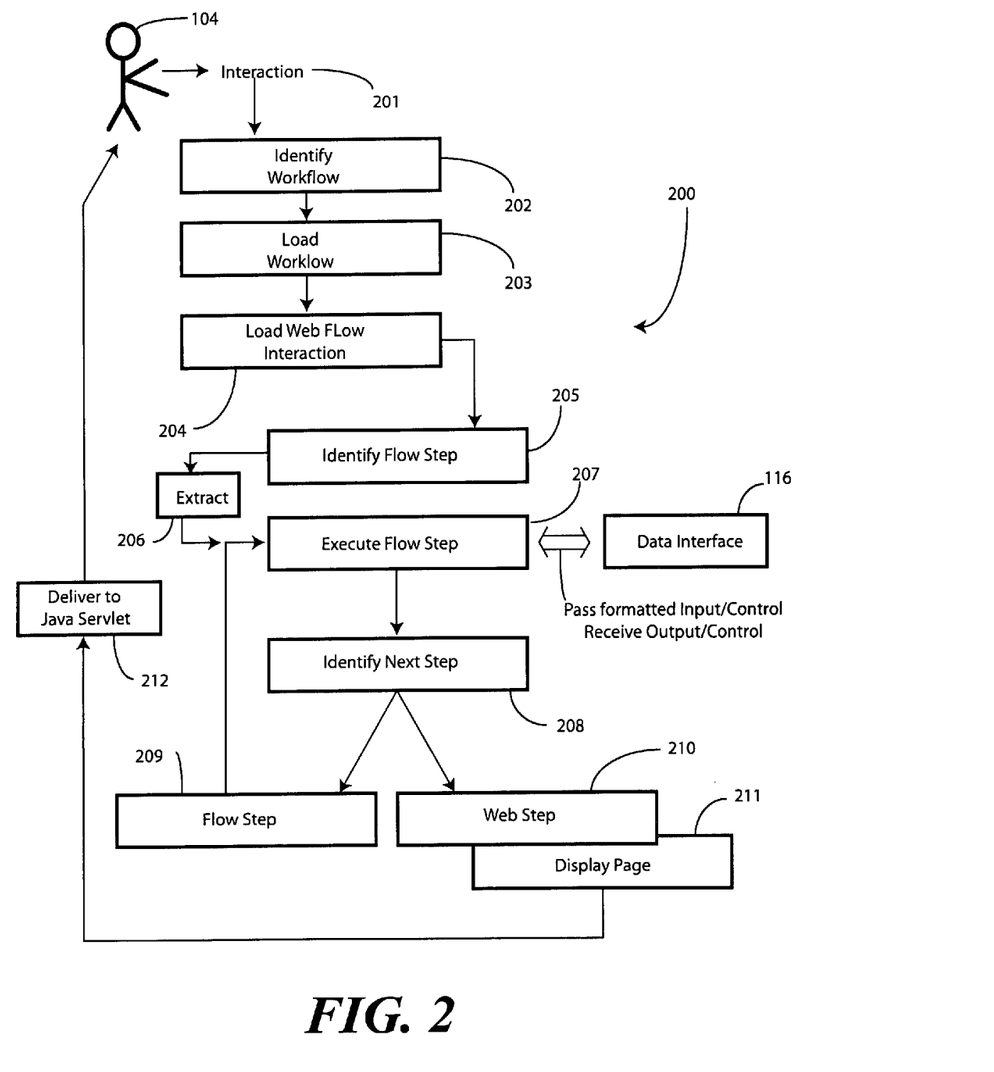
FIG. 2 illustrates one method of interfacing with a server-based information handling system in accordance with embodiments of the invention.

Turning now to FIG. 2, illustrated therein is one method 200 of interfacing with a server-based information handling system (102) in accordance with the invention. Such a method 200 is suitable for use with the system of FIG. 1. The method 200 may be coded into a workflow and stored in memory of a server or central computer system. The method 200 ensures application specific handling of data objects that can be customized, yet uses an off the shelf information handling system platform.

Generally speaking, a user 104 starts the process off with an interaction 201. The interaction may comprise the user 104 entering data into a client browser portal (105). The interaction may also be in response to an e-mail, text message, or other communication from a vendor to the user 104. For instance, the user 104 may see an on-line advertisement for credit services. The user 104 may click on the advertisement and provide some identifying information. The advertisement, which may be presented by a lead generation service, may then direct the information to a credit services vendor. The credit services vendor may then send an e-mail, text message or other communication to the user 104. Alternatively, the user 104 may be seamlessly directed to the vendor's website from the lead generation website. Upon either of these events, the user 104 may enter data, thereby executing an interaction 201.

Once an interaction 201 occurs, the data object resulting from the interaction is transferred to the system (100). Upon receiving the data object from the client browser portal (105), the method 200 first performs initiation procedures at step 202. In one embodiment, these initiation procedures ensure that the data object is coming from an actual person and not an automated system. Such procedures may include validating whether an active hypertext transfer protocol (HTTP) session exists. The initiation procedures may also perform other operations, including setting the proper language and ensuring that the proper file structures have been established for recording user data.

Figure 3:
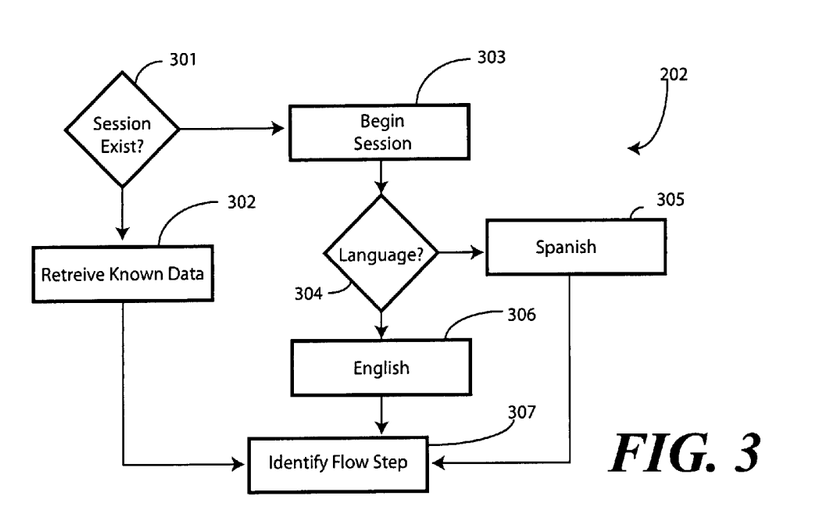
FIG. 3 illustrates one method of workflow loading in accordance with embodiments of the invention.

Turning briefly to FIG. 3, illustrated therein are examples of some of the initiation procedures stemming from step 202. At decision 301, the method (200) checks to see if an HTTP session exists. Where it does, any known data is retrieved at step 302. This known data may include customer information stored during a partially completed, prior web session.

Where the HTTP session does not exist, a session may be logged at step 303. Languages may be chosen at decision 304. For example, English may be chosen at step 304, or Spanish may be chosen at step 305. The initiation procedures may continue at step 307 by identifying next steps in the initiation workflow.

Turning now back to FIG. 2, once the initiation procedures have occurred, the method 200 then identifies the workflow at step 203. This work flow is associated with the data object. By way of example, if a new prospective borrower is accessing the front end of an on-line installment loan application, the system (100) may ask for the person's e-mail address and name to verify whether the person is new. The data object of name and e-mail address is transferred to the system (100) and is received by the interaction controller (110). The method 200 then identifies a "new customer" workflow that includes certain executable steps. Had the person been an existing customer, an alternate and different workflow would have been identified at step 203.

The method 200 then loads web flow interactions at step 204. A web flow interaction is a series of processes that includes both web steps, process steps, and flow steps. These steps orchestrate presentation and process flow of data objects to and from the information handling system (102). They further provide formatting and translation capabilities to ensure that data objects include the proper data in the proper form.

Web steps, generally, identify "forms" for data. These forms are general data structures into which data objects and data extracted from data objects may be transported. Web steps further redirect data objects to presentation components. Presentation components may include instructions or formatting on how data and data returned to the client browser portal (105) may be displayed. Flow steps capture completed forms—i.e. forms with data stored therein. The flow steps additionally introduce information into workflows for processing. The flow steps further are capable of interaction with the information handling system (102). The process step progresses a process activity in the workflow.

Once the web flow interactions have been loaded, the method 200 then identifies a flow step to be executed at step 205. The flow step identified may be to save data, edit data, remove data, query, and so forth. Other flow step types will be obvious to those of ordinary skill in the art having the benefit of this disclosure.

While some flow steps may operate on data objects, others may require a subset of the data object. This may depend upon the type of information handling system (102) being used with the system (100) of the present invention. Some information handling systems (102) may only accept data piecemeal. Others may accept more complex data objects. To accommodate the various systems, the optional step of extracting data from the data object occurs at step 206.

Once the flow step to be executed has been identified, the flow step is executed at step 207. As noted above, one feature of embodiments of the present invention is that data may be formatted into a form accepted by the information handling system (102). For instance, a JSON object may be translated to an XML object. This step of formatting the data object or extracted data into a predetermined format recognized by the data interface 116 of the information handling system (102) occurs as part of the flow step execution step. The method 200 delivers the extracted data from the data object to the data interface 116 of the information handling system (102) at step 207. As noted above, this delivery may include a transfer of process control as well. There may also be a pause in place after the step 205 of execution to allow the information handling system (102) to perform its own internal processes.

The next executable step from the workflow is identified at step 208. This next step could be either a flow step or a web step, as is indicated at step 209 and step 210, respectively. Where the next executable flow step comprises a flow step, the method returns to step 207 to execute the next flow step by delivering additional extracted data from the received data object to the data interface 116 of the information handling system (102). By way of example, the next executable flow step may include capturing a completed data set, such as prospective customer information in a completed form from a web step and delivering all or a portion of that data object to the data interface 116.

Where the next step is a web step, as shown at step 210, the execution may be different. For instance, as web steps include forms, the step of executing the web step may include the step 211 of identifying an empty data set structure. Once this empty data set structure has been identified, the execution of the web step may also include identifying a presentation component, such as a web interface format, that corresponds to the empty data structure. The empty data set structure and presentation component may be delivered to the client browser portal (105) at step 212.

Figure 4:
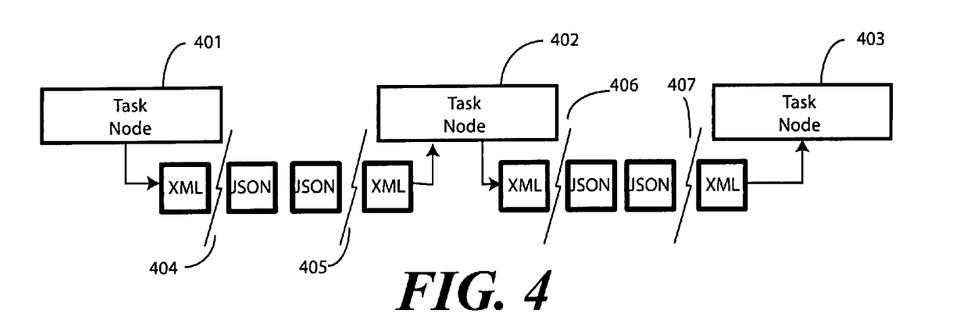
FIG. 4 illustrates one method of process flow associated with an information handling system in accordance with embodiments of the invention.

Turning now to FIG. 4, illustrated therein is one embodiment of a process flow associated with an information handling system in accordance with embodiments of the invention. For instance, such a process flow is included in embodiments of the '109 patent mentioned supra. The information handling system (102) operates in data at predefined task nodes 401, 402, 403. By way of example, the information handling system (102) may store data at a first task node 401, retrieve data at a second task node 402, and manipulate data at a third task node 403. Each of these tasks may require a user interaction (201) therebetween. As such, the system (100) of the present invention, to facilitate faster and more efficient data transfer, may perform conversions at conversion points 404, 405, 406, and 407.

Figure 5:
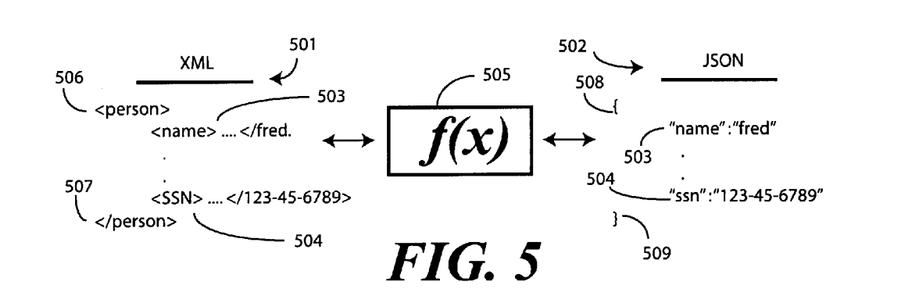
FIG. 5 illustrates one transformation of exemplary XML data to exemplary JSON data in accordance with embodiments of the invention.

Turning to FIG. 5, illustrated therein is one such conversion. As noted above, in one embodiment, the system converts XML data objects to JSON data objects, and vice versa. FIG. 5 illustrates an exemplary XML object 501 and an exemplary JSON object 502. These objects contain two data fields, name 503 and social security number 504. The system 505 performs a conversion at 505 by mapping the name 503 and social security number 504 data fields to the proper locations in the corresponding object.

As noted above, many information handling systems, such as that taught in the '109 patent, supra, employ XML as a data object language because XML is a well known standard for defining marked up information. In XML, data is described and represented through tags that are customizable and do not need to be defined in advance. Designers are free to invent new tags as needed.

An XML data object begins with a declaration (not shown) specifying the XML version and the type of character encoding. A root element 506 comes next, and encloses child elements, such as the name 503 and social security number 504. The child elements generally appear in a nested structure. The XML data object ends with a close tag 507 corresponding to the root element 506.

JSON data objects, by contrast, are not formatted as markup language objects. JSON is rather a text-based data interchange format. JSON data objects are formed in the syntax associated with Javascript objects. Embodiments of the present invention employ JSON data objects for efficient transfer because JSON permits simple data representation without additional object overhead. JSON requires only curly braces 508,509 to enclose objects. Square brackets are used to enclose arrays. Javascript code, such as that used in embodiments of the client browser portal (105) efficiently handle JSON data objects without any additional parsing or transformations.

Figure 6:
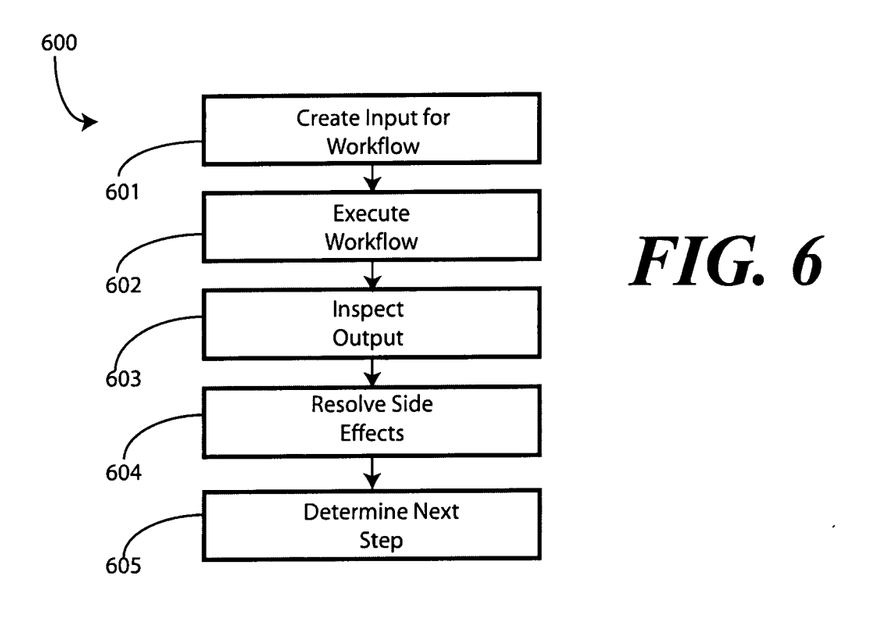
FIG. 6 illustrates one example of a process activity in accordance with embodiments of the invention.

Turning now to FIG. 6, illustrated therein is an alternate method for interfacing with an information handling system (102) in accordance with the invention. When comparing the method 600 of FIG. 6 to the method (200) of FIG. 2, the method 600 of FIG. 6 employs a single process activity instead of the web steps, flow steps, and process steps discussed with reference to FIG. 2. Thus, while a method involving the steps of FIG. 6 would employ some of the same steps as described with respect to FIG. 2, including receiving a data object form the client browser portal, extracting data from the data object, and formatting the extracted data, other steps are different as will be described below.

A "process activity" as used in the discussion of FIG. 6 is a process management construct is configured to start, pause, and complete workflows of the information handling system (102). Said differently, a process activity would be a component of the overall system (100) that is configured to start, pause, or complete a workflow associated with the information handling system described in the '109 patent. A process service is a remote access mechanism for the process activity. Thus, process services may be used, for example, from the client browser portal (105) to trigger process activities.

FIG. 6 illustrates the execution of an exemplary process activity. At step 601, the process activity creates an input for an information handling system workflow. At step 602, the process activity delivers the input—which may include extracted data from a data object received from the client browser portal (105)—to the information handling system such that it may execute its workflow. At step 603, the process activity inspects the output from the information handling system.

At step 604, side effects are resolved. Side effects are remnants that remain after an information handling system workflow step is executed. For example, if both name and social security number must be stored in the database, and confirmation must be given to the user, a side effect may be providing confirmation to the user. This side effect is resolved at step 604.

The process activity identifies a subsequent process activity at step 605. Since the output is inspected prior to this identification step 604, in some embodiments the identification of the subsequent process activity may be dependent upon completion of the workflow step or completion of the process activity.

Figure 7:
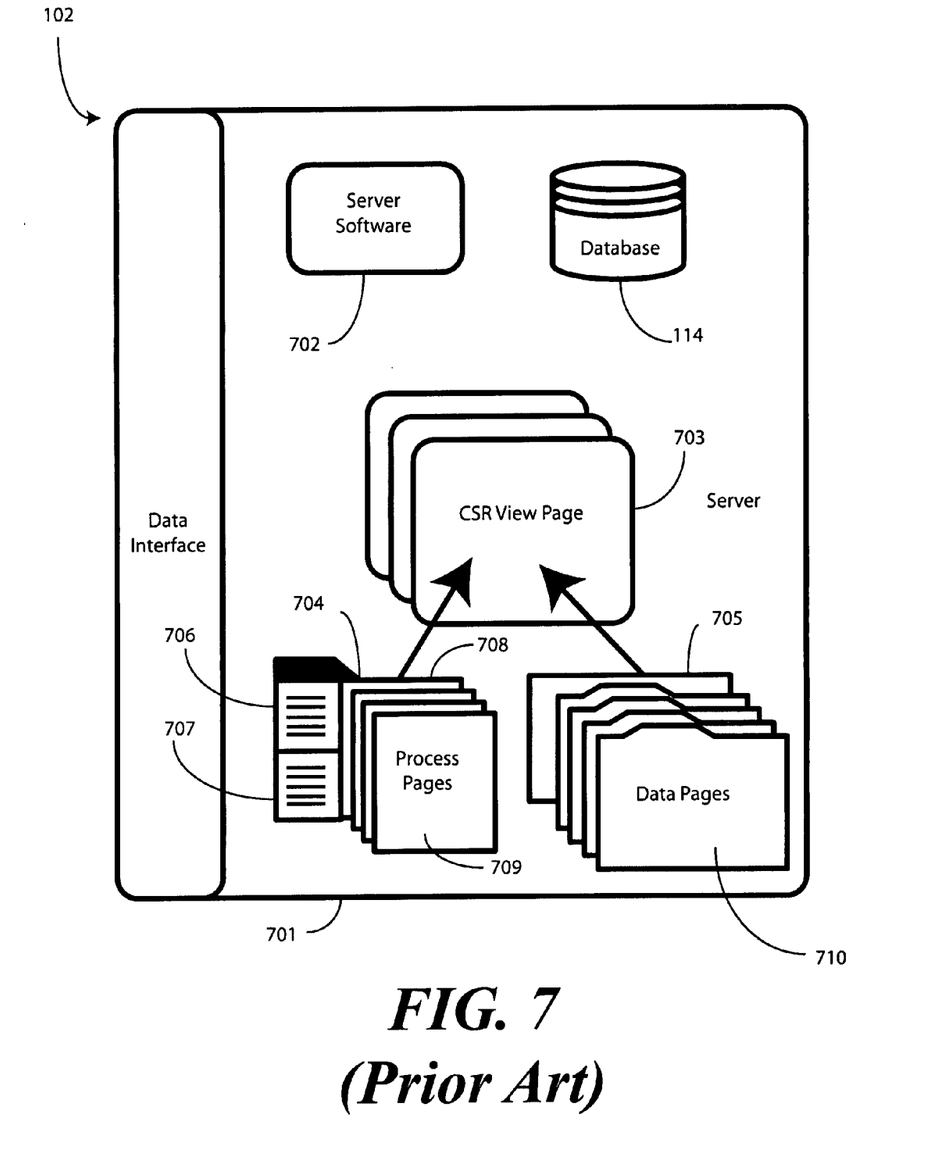
FIG. 7 illustrates one example of architecture of an information handling system for use with an interfacing system in accordance with embodiments of the invention.

Turning now to FIG. 7, illustrated therein is one prior art information handling system 102 suitable for use with embodiments of the present invention. The information handling system 102 may include one or more servers 701 that interconnect with various client machines. In the exemplary embodiment of an on-line installment loan application, the servers 701 may interconnect to both the lender's computer system and customer service representative systems.

To manage the various data objects selected for display or processing, the information handling system 102 may run prior art server software 702. The information handling system 102 will also have access to a database 114 or data store, which may be a single database or a plurality of separate but linked databases.

The database 114 is used to store extracted data and data objects. Each of these may be integrated into conceptual objects by the information handling system 102. The database 114 may be configured to store a predetermined type of data, such as an XML file. For example, in the case of software for use in connection with a customer call center for on-line installment loan applications, data may include, for example, customer name, credit information, account information, address or other location information, e-mail address, phone numbers, customer profile data, and so forth.

The information handling system 102 provides data to such customer service representatives by delivering web pages 703 to customer service representative terminals. Each of the web pages 703 may include a process panel 704 and data panel 705. These panels may be arranged in an overlapping manner within a common window on the web page 703.

In one embodiment, the process panel 704 includes one or more process list regions 706 and 707 for display of available processes. The process panel 704 may also include a process display region 708 for the display of one or more process pages 709. The data panel 705, in one embodiment, may display one or more data pages 710. These data pages 710 are configured to display data retrieved from the database 114.

As noted several times herein, one suitable application for a system (100) or method (200,600) in accordance with the invention is that of an on-line installment loan system. Further, as has been described herein, data objects are received by the system (100) from a client browser portal (105), which may include a HTML page and a servlet. The remaining discussion is directed to such a system. The figures will present some of the information presented by web steps, as well as some of the data received and operated on by flow steps or process activities.

Figure 8:
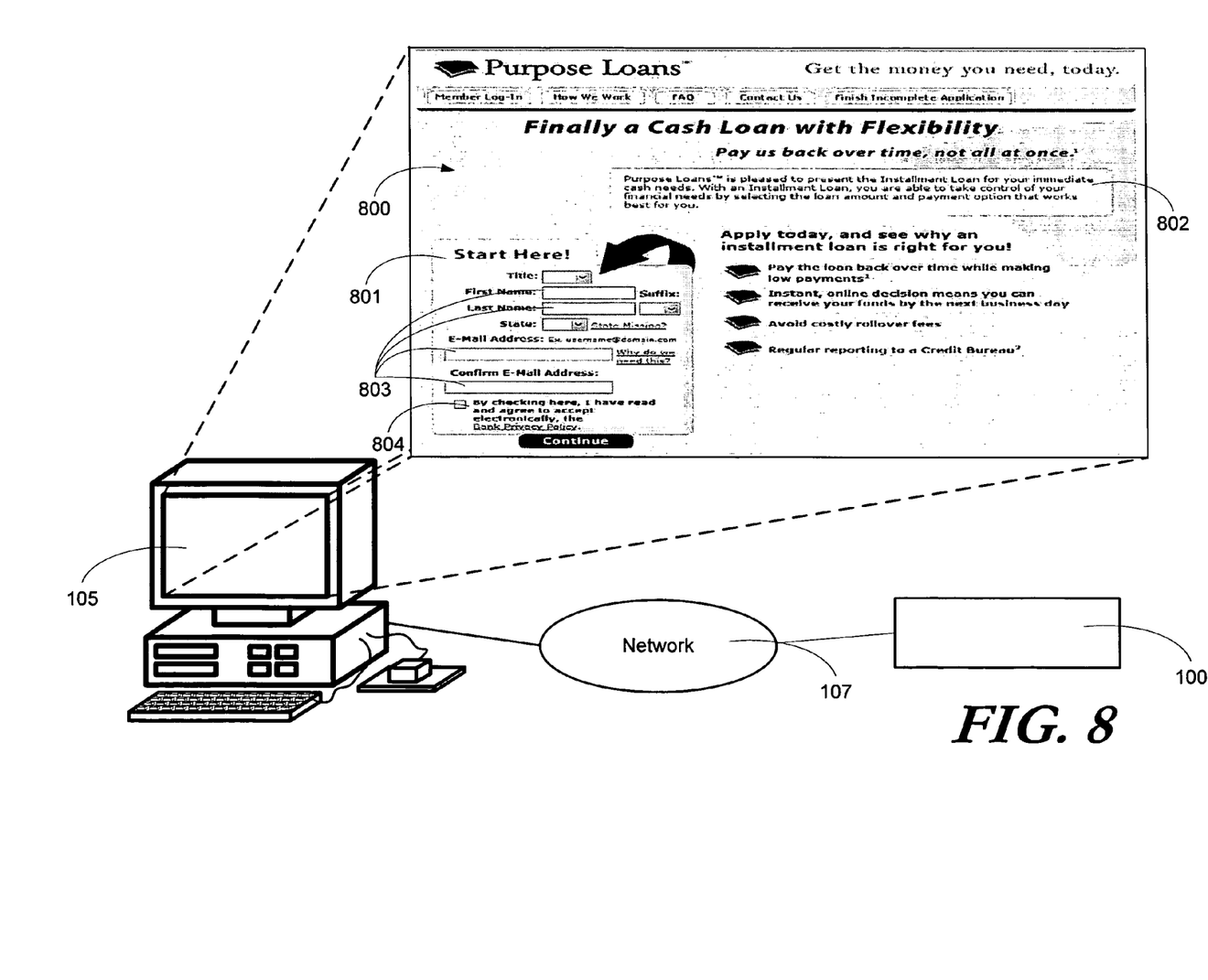
FIG. 8 illustrates one screen shot from an automated loan offering system, which is one application facilitated by an interface system in accordance with embodiments of the invention.

Turning first to FIG. 8, illustrated therein is one embodiment of an electronic loan application 800 presented on a client browser portal (105). A lender employing a system 100 in accordance with the invention may provide prospective borrowers with access to the electronic loan application 800 over a network 107, such as the Internet. The prospective borrower uses the client browser portal 105, which in one embodiment is an Internet browser, to access the electronic loan application 800.

The illustrative embodiment shown in FIG. 8 is that of an electronic loan application 800 comprising a start page 801. In one embodiment, the prospective borrower is first presented with the start page 801 upon accessing the system 100. The start page 801 may comprise company information 802 introducing the prospective borrower to the on-line lending company. The prospective borrower may need to provide at least one piece of personal identification information 803 before continuing to the actual on-line loan application. This personal identification information 803, in one embodiment, is transferred from the servlet (not shown) to the system as a JSON data object. The personal identification information 803 may include, but is not limited to, a name, an email address, or a user identification name.

The prospective borrower may be required to read and agree to a lender privacy policy 804. This may occur after the personal identification information 803 is entered, but before more of the electronic loan application 800 is presented. Once the prospective borrower has both indicated that the privacy policy 804 has been read and has entered the personal identification information 803, the personal identification information 803 and the acceptance of the lender privacy policy 804 are then transmitted to the system 100 over the network 107.

Figure 9:
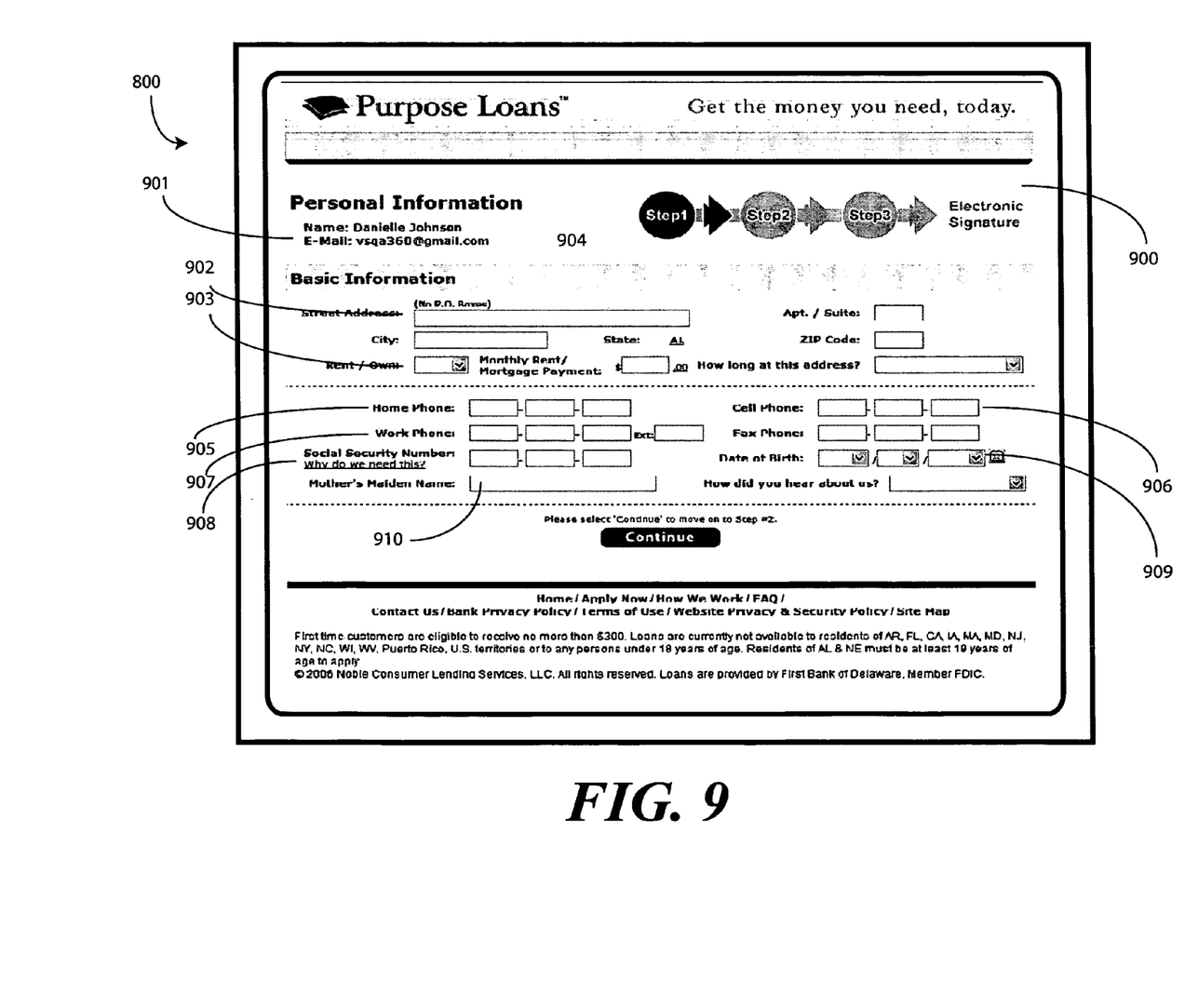
FIG. 9 illustrates one screen shot from an automated loan offering system, which is one application facilitated by an interface system in accordance with embodiments of the invention.

Turning now to FIG. 9, illustrated therein is one embodiment of the electronic loan application 800 comprising a personal information request page 900 on which a prospective borrower is queried for additional personal information 901. The personal information request page 900 may be presented to the prospective borrower following the transmission of the personal identification information (803). In one embodiment, the requested personal information 901 includes the prospective borrower's home address 902, residential status (owner or renter) 903, amount of housing payments (mortgage or rent) 904, home telephone number 905, cell phone number 906, work phone number 907, social security number 908, date of birth 909, and mother's maiden name 910. The personal information 901 entered by the prospective borrower is then transmitted system (100).

Figure 10:
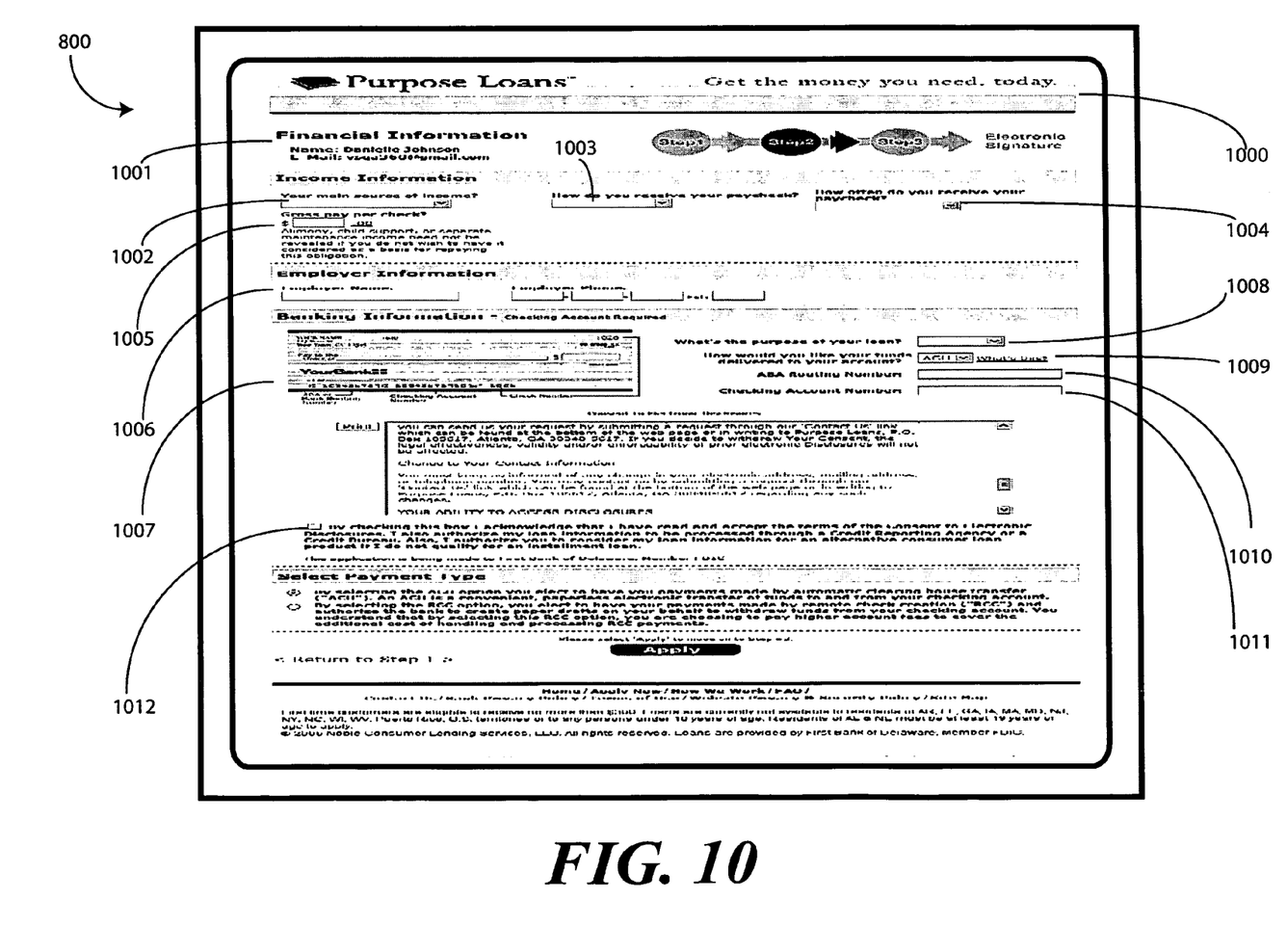
FIG. 10 illustrates one screen shot from an automated loan offering system, which is one application facilitated by an interface system in accordance with embodiments of the invention.

Turning to FIG. 10, illustrated therein is one embodiment of the electronic loan application 800 comprising a financial information request page 1000 on which the prospective borrower is queried for financial information 1001. The financial information request page 1000 may be presented to the prospective borrower following submission of the personal information (901). In one embodiment, the financial information 1001 is used by the system (100) to determine whether to approve the prospective borrower, as well as whether to present a loan offer to the prospective borrower. The requested financial information 1001 may include, but is not limited to, the prospective borrower's source of income 1002, method of receiving paychecks 1003, frequency of receiving paychecks 1004, amount of paychecks 1005, and employer information 1006.

In one embodiment, the financial information 1001 includes banking information 1007. Providing banking information 1007 may help expedite repayment of the loan through the electronic transfer of funds from a checking account. Additionally, electronic transfer of funds may reduce the overall cost of the loan to the prospective borrower. In one embodiment an Automatic Clearing House (ACH) is used to facilitate the repaying of the loan offer. Requested banking information may include: a purpose for the loan 1008, a method for electronic transfer of funds 1009, such as ACH or remote check creation, an American Banking Association (ABA) routing number 1010, a checking account number 1011, and an acknowledgement of having read terms and conditions 1012 corresponding to consent of electronic disclosure.

The financial information 1001 is then sent over the network (107) to the system (100). The system (100) then works with the information handling system (102) to store the data and operate on the data, making decisions as to whether to offer the prospective borrower the loan.

Figure 11:
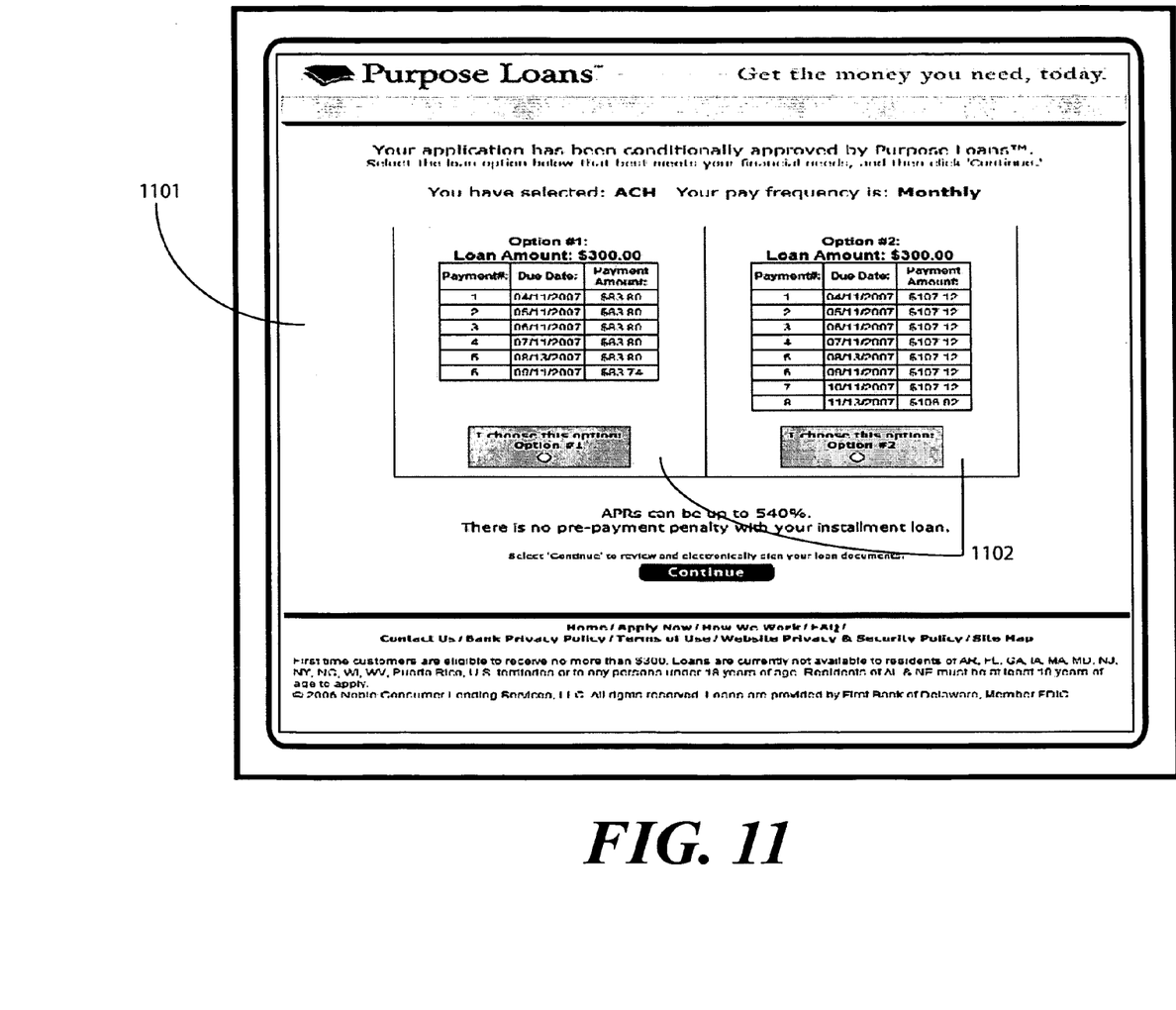
FIG. 11 illustrates one screen shot from an automated loan offering system, which is one application facilitated by an interface system in accordance with embodiments of the invention.

Turning to FIG. 11, illustrated therein is one embodiment of the one or more loan offers 1101 presented, via the Network (107), on the client browser portal (105). In the illustrative embodiment of FIG. 11, two different loan offers 1102 are presented. While two loan offers 1102 are shown, one, three, or four or more loan offers could equally be shown. Multiple loan offers may be presented when the prospective borrower has optional payment schedules. Additionally, multiple loan offers may be presented when the prospective borrower qualifies for differing loan amounts.

Figure 12:
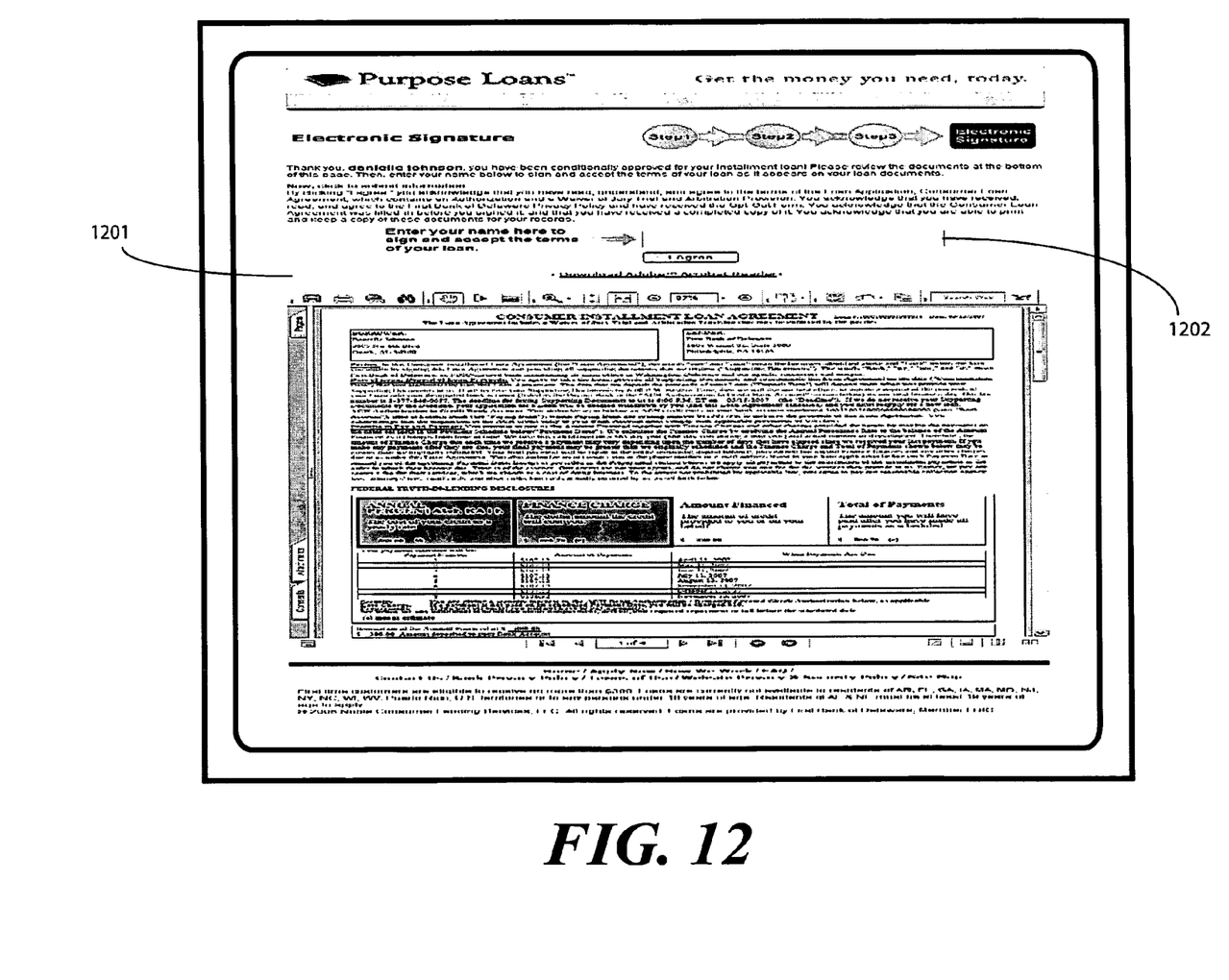
FIG. 12 illustrates one screen shot from an automated loan offering system, which is one application facilitated by an interface system in accordance with embodiments of the invention.

Turning now to FIG. 12, illustrated therein is one embodiment of the terms and conditions agreement 1201 presented on the client browser portal (105). In one embodiment, a terms and conditions agreement 1201 may be presented along with the one or more loan offers (1102). The terms and conditions agreement 1201 may, among other things, inform the prospective borrower about their fiscal responsibility upon accepting a loan offer. Such fiscal responsibility may include knowledge of annual percentage rates, finance charges, total amount financed, and amount of monthly payments. Privacy information and other processing information may additionally be presented.

In one embodiment, the terms and conditions agreement 1201 includes a request 1202 for the terms and conditions agreement 1201 to be executed. Execution of the terms and conditions agreement 1201 may be required before any one loan can be completed. The execution may be implemented directly by electronic signature via the client browser portal (105) or, alternatively, a printed copy of the signed executed terms and conditions agreement may be signed by the prospective borrower and delivered to the lender by facsimile or mail.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An interface system configured for interaction between a networked client portal and a server-based information handling system, comprising:
    an interaction controller configured to receive data objects from a client browser portal and to identify a predetermined workflow corresponding to the data objects, wherein the interaction controller comprises:
        a web step manager configured to load a workflow interaction component associated with the predetermined workflow, wherein the workflow interaction component comprises at least one executable flow step; and
        a flow step manager configured to execute each of the at least one executable flow steps by at least delivering extracted data from the data objects to a data interface of the server-based information handling system and to determine any next flow steps remaining from the at least one executable flow step; and
    a workflow processor configured to adapt the extracted data into a predetermined format recognized by the data interface of the server-based information handling system;
    wherein the flow step manager is configured to give temporary process control to the server-based information handling system upon delivering the extracted data and receive control one the server-based information handling system has processed the extracted data;
    wherein the server-based information handling system comprises combined data viewer and data processing system for use with a computer-based information handling system having a display device and that displays on a screen of said display device a user interface for viewing reference data associated with a conceptual entity and for execution of multiple complex processes for manipulating said reference data, said combined data viewer and data processing system comprising: a process panel comprising a first region including a list of all the complex processes, a second region for displaying a list of all currently running ones of the complex processes, and a third region comprising a process work area for display of a state of a selected process and/or receiving user input; a data viewer comprising a content pane for display of data associated with said conceptual entity; a common window framing the process panel and the data viewer; said process work area and said content pane being selectably viewable and occupying overlapping positions within said common window; and said first, second, and third regions being mutually non-overlapping.

2. The interface system of claim 1, wherein the data objects comprise JSON data.

3. The interface system of claim 2, wherein the predetermined format comprises XML format.

4. The interface system of claim 1, wherein the client browser portal comprises a Java servlet configured to locate and manipulate the data objects.

5. The interface system of claim 4, wherein the client browser portal further comprises an html webpage providing an electronic loan application.

6. The interface system of claim 1, wherein the any next flow steps remaining from the at least one executable flow step comprise one of another flow step or a web step.

7. The interface system of claim 6, wherein the web step comprises display information for presentation on the client browser portal.

8. The interface system of claim 1, wherein the workflow interaction component comprises a form, wherein the form comprises a predetermined data arrangement.

9. The interface system of claim 1, wherein the flow step manager is further configured to pause upon delivering the temporary process control to the data interface of the server-based information handling system.

10. A method of interfacing with a server-based information handling system, the method comprising the steps of:
receiving a data object from a client browser portal;
identifying a workflow associated with the data object from the client browser portal;
retrieving a web flow interaction corresponding to the workflow;
identifying a flow step to be executed;
extracting extracted data from the data object;
formatting the extracted data into a predetermined format recognized by a data interface of the server-based information handling system;
executing the flow step by delivering the extracted data from the data object and temporary process control to the data interface of the server-based information handling system; and
identifying a next executable step upon executing the flow step;
wherein the next executable step comprises a next flow step further comprising the step of executing the next flow step by delivering the extracted data from the data object to the data interface of the server-based information handling system;
wherein the step of executing the next flow step comprises capturing a completed data set and delivering at least a portion of the data object to the data interface of the server-based information handling system.

11. The method of claim 10, wherein the next executable step comprises a web step, further comprising the steps of executing the web step by:
identifying an empty data set structure;
identifying a presentation component corresponding to the empty data set structure; and
delivering the empty data set structure and the presentation component to the client browser portal.

12. The method of claim 10, wherein the step of formatting the extracted data into the predetermined format recognized by the data interface of the server-based information handling system comprises transforming the extracted data from JSON format to XML format.

13. The method of claim 10, further comprising the step of pausing after the step of executing the flow step.

14. A method of interfacing with a server-based information handling system, the method comprising the steps of:
receiving a data object from a client browser portal;
identifying a process activity corresponding to the data object, wherein the process activity comprises a process management construct that is configured to initiate, pause, and complete a workflow in the server-based information handling system;
extracting extracted data from the data object;
formatting the extracted data into a predetermined format recognized by a data interface of the server-based information handling system;
executing the process activity, wherein the step of executing comprises delivering the extracted data from the data object and temporary process control to the data interface of the server-based information handling system; and
identifying a subsequent process activity, wherein identification of the subsequent process activity is dependent in part upon completion of the process activity;
further comprising the step of resolving side effects resulting from the step of executing the process activity, wherein the side effects comprises providing confirmation at the client browser portal that a predefined data field must be stored in a database, the predefined data field comprising a social security number.

15. The method of claim 14, wherein the client browser portal comprises a web-based loan offer system.

16. The method of claim 14, wherein the process activity comprises at least one java server tag.

* * * * *